UNITED STATES PATENT OFFICE.

JAMES BOWKER, OF BALTIMORE, MARYLAND, ASSIGNOR TO BAIR BROTHERS & CO., OF SAME PLACE.

IMPROVEMENT IN PAINT FOR SHIPS' BOTTOMS, &c.

Specification forming part of Letters Patent No. 103,290, dated May 24, 1870.

*To whom it may concern:*

Be it known that I, JAMES BOWKER, of the city and county of Baltimore, and State of Maryland, have invented a new and Improved Paint for Ships' Bottoms and other purposes, of which the following is a specification:

My improved copper paint is composed of arsenite and arsenate of copper, creosote, wood-tar, an oil called "pine-oil," for which Letters Patent were granted to James D. Stanley January 5, 1869, asphalt, and benzine, taken in about the following proportions:

Arsenite of copper, twenty-five per cent., by weight; arsenate of copper, ten per cent., by weight; creosote, five per cent., by weight; wood-tar, thirty-six per cent., by weight; pine-oil, ten per cent., by weight; asphalt, three per cent., by weight; benzine, eleven per cent., by weight.

Arsenite of copper is prepared by dissolving arsenious acid into an alkaline solution of soda or potassa and gradually adding it to a solution of sulphate of copper. Arsenite of copper is precipitated, which is collected, washed, and dried.

My method of preparing arsenate of copper is to distill a given quantity of arsenious acid with nitric and hydrochloric acids until the contents of the retort have acquired the consistency of sirup. It is then dried with a gentle heat, and the arsenic acid thus formed is dissolved in a solution of soda and gradually added to a solution of sulphate of copper. Arsenate of copper is precipitated, which is collected, washed, and dried. These two compounds of copper are then finely powdered and ground in a mill with a mixture of wood-tar and pine-oil, so as to make a paint of uniform composition and consistency. The creosote is then added, with the asphalt and the benzine, the former having been previously dissolved in the latter, so as to make a quick and hard-drying varnish.

I am aware that arsenite of copper has been previously employed as an ingredient in paints for similar purposes; but it has never before been combined, to my knowledge, with arsenate of copper, creosote, pine-oil, asphalt, and benzine, all of which possess valuable and desirable properties for the protection and preservation of the bottoms of vessels and other wooden structures.

Arsenate of copper is a virulent poison and one of the most effectual compounds for the protection of the bottoms of vessels against the destructive influence of worms and the adhesion of barnacles, sea-shells, and sea-grasses.

Creosote, as its name implies, is one of the most powerful of antiseptics, preserving effectually organic substances from decay, and hence its value as an ingredient of the paint.

Pine-oil is also a valuable antiseptic, on account of the creosote and pyroxylic spirit it contains, and is used not only as a solvent for the tar, but also as an adjunct to the creosote.

Wood-tar is used as an ingredient of the paint on account of its adhesive qualities, and when combined with the asphalt and benzine forms a hard smooth surface, impenetrable by water.

Instead of using both the arsenite and arsenate of copper, either of said substances may be used singly, in combination with the other ingredients hereinbefore named.

I do not confine myself to the exact proportions stated of the several ingredients; but

What I claim as my invention, and desire to secure by Letters Patent, is—

An improved copper paint for ships' bottoms and other purposes, composed of arsenite or arsenate of copper, or both arsenite and arsenate of copper, wood-tar, pine-oil, asphalt, and benzine, substantially as herein set forth.

In testimony whereof I have signed my name to this specification before two subscribing witnesses.

JAMES BOWKER.

Witnesses:
A. POLLOK,
W. DAILY.